United States Patent
Saito

(10) Patent No.: US 8,204,608 B2
(45) Date of Patent: Jun. 19, 2012

(54) MONITORING AND CONTROL APPARATUS

(75) Inventor: Masahiro Saito, Chiyoda-ku (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 235 days.

(21) Appl. No.: 12/777,727

(22) Filed: May 11, 2010

(65) Prior Publication Data

US 2011/0046749 A1 Feb. 24, 2011

(30) Foreign Application Priority Data

Aug. 20, 2009 (JP) ................................ 2009-190594

(51) Int. Cl.
*G06F 19/00* (2006.01)
*G05B 11/01* (2006.01)

(52) U.S. Cl. ................ 700/12; 700/29; 703/13; 703/21

(58) Field of Classification Search ............... 700/12, 700/19, 26, 27, 29; 703/3, 4, 13, 14, 15, 703/16, 20, 21, 22

See application file for complete search history.

(56) References Cited

U.S. PATENT DOCUMENTS

| | | | |
|---|---|---|---|
| 6,263,302 B1 * | 7/2001 | Hellestrand et al. | 703/20 |
| 7,054,694 B2 * | 5/2006 | Fujinami et al. | 700/29 |
| 7,408,336 B2 * | 8/2008 | Birmiwal et al. | 703/14 |
| 7,430,502 B2 * | 9/2008 | Hobson | 703/15 |
| 7,783,370 B2 * | 8/2010 | Nixon et al. | 703/3 |
| 7,899,661 B2 * | 3/2011 | Rompaey et al. | 703/22 |

FOREIGN PATENT DOCUMENTS

| | | |
|---|---|---|
| JP | 62-276991 A | 12/1987 |
| JP | 9-114689 A | 5/1997 |

* cited by examiner

*Primary Examiner* — Charles Kasenge
(74) *Attorney, Agent, or Firm* — Buchanan Ingersoll & Rooney PC

(57) ABSTRACT

A plant monitoring and control apparatus having a function to simulate an object to be monitored and controlled for verifying healthiness of a control processing unit is provided with an input separating operation unit and an output separating operation unit which separate DI data and DO data handled by the control processing unit by transforming the DI data and the DO data into a label format differing from a label format of PDI data and PDO data which are related to input and output between the object to be monitored and controlled and the plant monitoring and control apparatus. In test mode, a switching unit switches an input device of the control processing unit and an output device thereof to a simulator unit provided within the plant monitoring and control apparatus.

8 Claims, 8 Drawing Sheets

MONITORING AND CONTROL APPARATUS

BACKGROUND OF THE INVENTION

1. Field of the Invention

The present invention relates to a monitoring and control apparatus for monitoring and controlling facilities and equipment of a plant and, more particularly, to a monitoring and control apparatus provided with means for verifying healthiness of a control processing unit within the apparatus.

2. Description of the Background Art

One known conventional system of this kind is a measurement control system disclosed in Japanese Laid-open Patent Application No. 1987-276991, for example. In this measurement control system, a detecting end device and an operating end device provided on-site are connected to a control unit by transmission lines, and the control unit collects measurement information from the detecting end device and controls the operating end device by performing specific control processing operation. The measurement control system includes a data input unit and a data display unit provided on the outside of the control unit, and when the control unit performs its own test, the control unit causes the data input unit to transmit simulated data for testing, processes the simulated data by a control processing program of the control unit and displays a test result on the data display unit.

Another known system of this kind is a conventional test support system described in Japanese Laid-open Patent Application No. 1997-114689, for example. The test support system for testing programmable logic controllers (PLCs) which are interconnected on a communication network and serve as constituent elements of a distributed system is provided with a PLC emulator, instead of the PLCs on the network, for simulating transmission and reception of data to and from a group of personal computers and a data storage function.

In the system of Japanese Laid-open Patent Application No. 1987-276991 cited above, transmission and reception through the transmission line between the control unit and the on-site devices are interrupted or switched at the time of testing and, then, the simulated data is generated and input into the control unit and the test result is output. Even if the system is so configured as to automatically generate the simulated data as described in Japanese Laid-open Patent Application No. 1997-114689 cited above, it is necessary to provide an external device for inputting and outputting the simulated data to and from the control unit. Furthermore, it is not easy to switch the transmit/receive operation between the control unit and the on-site devices which are actually used during real operation to transmit/receive operation between the control unit and the external device for inputting and outputting the simulated data, and this makes it difficult to achieve a reduction in size and simplification of the system configuration.

SUMMARY OF THE INVENTION

The present invention has been made to solve the aforementioned problems of the prior art. Accordingly, it is an object of the invention to provide a monitoring and control apparatus for monitoring and controlling facilities and equipment of a plant which makes it possible to easily verify healthiness of a control processing unit with a compact and simple system configuration without requiring an externally provided device for inputting and outputting simulated data.

A monitoring and control apparatus according to the present invention is an apparatus for controlling an external object to be monitored and controlled by performing specific control processing operation based on state information collected from the object to be monitored and controlled, the apparatus including a real information input unit, an input separating operation unit, a control processing unit, an output separating operation unit, a real information output unit, a simulator unit and a switching unit. The real information input unit receives the state information which is a physical signal input from the object to be monitored and controlled and converts the state information into a real information label format which can be processed by software. The input separating operation unit label-converts the state information converted into the real information label format into a separated information label format which is handled by the control processing unit and outputs the state information thus converted to the control processing unit. The control processing unit performs the aforementioned specific control processing operation based on the state information label-converted into the separated information label format and outputs control information in the separated information label format. The output separating operation unit label-converts the control information fed from the control processing unit into the real information label format. The real information output unit converts the control information label-converted into the real information label format into a physical signal and outputs the physical signal thus converted to the object to be monitored and controlled. The simulator unit simulates the object to be monitored and controlled by using the control information in the separated information label format which is an output from the control processing unit as an input and outputs simulated state information in the separated information label format. The switching unit switches the monitoring and control apparatus between real operation for monitoring and controlling the object to be monitored and controlled and simulative operation for operating the simulator unit.

According to this invention, the information expressed in the real information label format which is related to input and output between the external object to be monitored and controlled and the monitoring and control apparatus and the information expressed in the separated information label format handled by the control processing unit have different label formats which are label-converted to each other. For this reason, the information in the real information label format concerning the input and output is not directly related to the control processing unit, so that it is possible to easily switch an input device of the control processing unit and an output device thereof to the simulator unit provided within the monitoring and control apparatus. Therefore, it is possible to easily verify healthiness of the control processing unit with a further small-sized and simplified system configuration having the internally provided simulator unit.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

Figure 1:
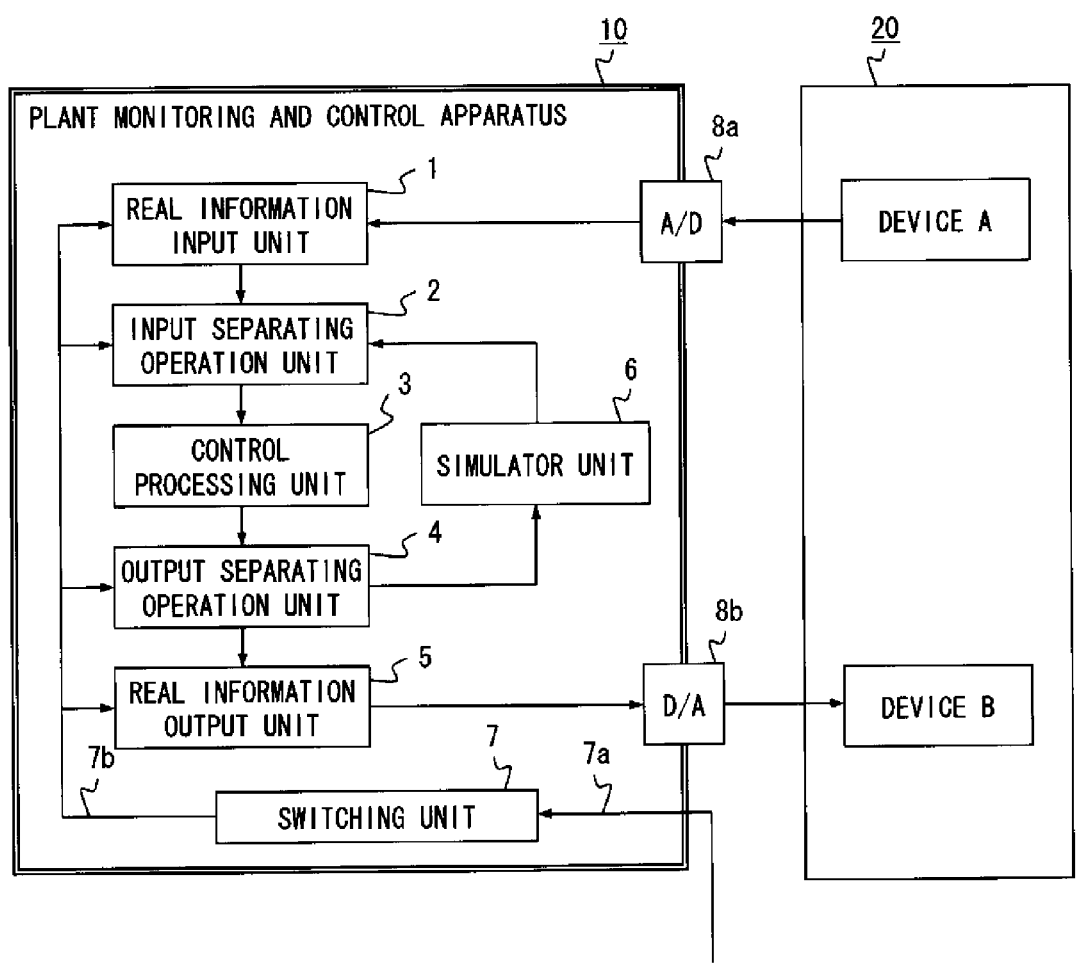
FIG. 1 is a block diagram showing the configuration of a plant monitoring and control apparatus according to a first embodiment of the invention.

As a monitoring and control apparatus according to a first embodiment of the present invention, a plant monitoring and control apparatus 10 for monitoring and controlling facilities, equipment, etc. of a plant 20, for instance, is described hereunder with reference to the accompanying drawings. FIG. 1 is a block diagram showing the configuration of the plant monitoring and control apparatus 10 according to the first embodiment of the invention.

As shown in the Figure, the plant monitoring and control apparatus 10 which is connected to individual facilities and pieces of equipment (devices A and B in this embodiment) by cables and/or communication lines includes a real information input unit 1, an input separating operation unit 2, a control processing unit 3, an output separating operation unit 4, a real information output unit 5, an analog-to-digital (A/D) converter 8a and a digital-to-analog (D/A) converter 8b. State information which is such physical signals as voltages and/or currents that are dependent on the state of the device A within the plant 20 is input into the plant monitoring and control apparatus 10 through the A/D converter 8a, the control processing unit 3 performs specific control processing operation based on the input state information, and control information which is such physical signals as voltages and/or currents to the device B within the plant 20 through the D/A converter 8b.

The plant monitoring and control apparatus 10 further includes a simulator unit 6 and a switching unit 7, so that the plant monitoring and control apparatus 10 can be switched by the switching unit 7 between real operation for monitoring and controlling the plant 20 and simulative operation for testing the control processing unit 3 by operating the simulator unit 6 which simulates the working of the equipment within the plant 20 by software.

While the plant monitoring and control apparatus 10 is configured to collect the state information from a number of facilities and pieces of equipment within the plant 20 and to monitor and control the plant 20 by outputting the control information to the individual facilities and pieces of equipment, the present embodiment is described herein referring only to the mutually related devices A and B for the convenience of explanation.

Now, individual elements of the plant monitoring and control apparatus 10 are described in detail.

The real information input unit 1 receives the state information which is physical signals input from the device A through the A/D converter 8a, converts the state information into a label format (hereinafter referred to as the real information label format) which can be processed by software, and outputs the information thus converted. The state information converted into the real information label format is hereinafter referred to as PDI data (where PDI stands for "Process Data In").

The input separating operation unit 2 receives the PDI data input from the real information input unit 1, label-converts the PDI data into a label format (hereinafter referred to as the separated information label format) which is handled by the control processing unit 3, and outputs the label-converted data. The state information label-converted into the separated information label format is hereinafter referred to as DI data (where DI stands for "Data In").

An input side of the control processing unit 3 is connected to the input separating operation unit 2 and an output side of the control processing unit 3 is connected to the output separating operation unit 4. The control processing unit 3 receives the DI data input from the input separating operation unit 2, performs the specific control processing operation, such as numerical control processing operation, sequence control processing operation or warning detection, based on the DI data, and outputs the control information expressed in the separated information label format. This control information expressed in the separated information label format is hereinafter referred to as DO data (where DO stands for "Data Out").

The output separating operation unit 4 receives the DO data input from the control processing unit 3, label-converts the DO data into the real information label format, and outputs the label-converted data. The control information label-converted into the real information label format is hereinafter referred to as PDO data (where PDO stands for "Process Data Out").

The real information output unit 5 receives the PDO data input from the output separating operation unit 4, converts the PDO data into the control information expressed in the form of physical signals, and outputs the control information thus converted. Then, the control information is output from the plant monitoring and control apparatus 10 to the device B through the D/A converter 8b.

An input side of the simulator unit 6 is connected to the output separating operation unit 4 and an output side of the simulator unit 6 is connected to the input separating operation unit 2. The simulator unit 6 receives the DO data output from the control processing unit 3 through the output separating operation unit 4, simulates the devices A and B which are objects to be monitored and controlled and outputs simulated state information (DI data) expressed in the separated information label format. This simulated state information (DI data) is input into the control processing unit 3 through the input separating operation unit 2.

The control processing unit 3 performs the control processing operation based on the simulated state information (DI data) and outputs simulated control information (DO data), and the simulator unit 6 receives the simulated control information (DO data) through the output separating operation unit 4 and outputs again the simulated state information (DI data). Such a sequence of operations is repeatedly carried out.

Both of the DI data and the DO data are not discriminated from each other as being simulated information or real information but are processed in the same fashion within the control processing unit 3.

Next, the working of the plant monitoring and control apparatus 10 is described with reference to a flowchart of FIG. 2.

First, a judgment is made to determine whether the plant monitoring and control apparatus 10 is in real operation mode or test (simulative operation) mode (step s1). A switching command 7a for switching the apparatus 10 between the real operation mode and the test mode may be given in various ways. For example, the switching command 7a may be given by the switching unit 7 provided in the apparatus 10, as an external input, or by transmission from an external man-machine device. The switching unit 7 switches the mode by outputting a switching signal 7b according to the given switching command 7a.

In the real operation mode, the real information input unit 1 receives the state information which is physical signals from the device A through the A/D converter 8a and generates the PDI data (label: PDI01, value: 1, for example) by converting the state information into the real information label format which can be processed by software. Specifically, the real information input unit 1 substitutes the label and value of the PDI data into input data regions (step s2a: real information input operation).

Then, the input separating operation unit 2 generates the DI data by label-converting the PDI data fed from the real information input unit 1 into the separated information label format. Specifically, the input separating operation unit 2 generates the DI data (label: DI01=PDI01, value: 1) by substituting the label and value of the PDI data into data regions which are used by the control processing unit 3 in the processing operation. This operation is a processing operation for separating the DI data used by the control processing unit 3 from the PDI data by transforming the DI data into a label format differing from the label format of the PDI data (step s3a: input separating operation).

Next, the control processing unit 3 generates the DO data which constitutes the control information by performing the specific control processing operation based on the state information which is the DI data fed from the input separating operation unit 2. In this case, if the specific control processing operation is an operation for "setting the value of the DO data to 1 when the value of the DI data is 1 and otherwise setting the value of the DO data to 0", the DO data (label: DO01, value: 1) is generated (step s4: control processing operation).

Next, the output separating operation unit 4 receives the DO data input from the control processing unit 3 and generates the PDO data by label-converting the DO data into the real information label format. Specifically, the output separating operation unit 4 generates the PDO data (label: PDO01=DO01, value: 1) by substituting the label and value of the DO data into data regions of the PDO data. This operation is a processing operation for separating the DO data and the PDO data from each other by transforming the DO data generated by the control processing unit 3 and the PDO data into different label formats (step s5a: output separating operation).

Next, the real information output unit 5 converts the PDO data fed from the output separating operation unit 4 into the control information expressed in the form of physical signals and outputs the control information to the device B in the plant 20 through the D/A converter 8b (step s6a: real information output operation).

Subsequently, if the operation of the plant monitoring and control apparatus 10 is not to be stopped (step s8), the operation is returned to step s1 after a specific time period of delay (step s9).

When switching the plant monitoring and control apparatus 10 from the real operation mode to the test mode, the real information input unit 1 and the real information output unit 5 are caused to stop operating by the switching signal 7b output from the switching unit 7. Then, the input separating operation unit 2 receives information from the simulator unit 6 and the output separating operation unit 4 outputs information to the simulator unit 6. The simulator unit 6 operates upon receiving the information from the output separating operation unit 4 and outputs the DI data by simulating the devices A and B.

If the plant monitoring and control apparatus 10 is in the test mode in step s1 on the other hand, the plant monitoring and control apparatus 10 performs the following operations.

The real information input unit 1 stops the real information input operation and does not generate new PDI data (step s2b).

Then, the input separating operation unit 2 generates the DI data from the PDI data fed in a preceding cycle (during the real operation) in a first cycle in the test mode. Also, in a second cycle and later in the test mode, the input separating operation unit 2 employs DI data generated by later-described simulation operation of step s7 (step s3b: input separating operation).

Next, the control processing unit 3 generates the DO data by performing the specific control processing operation based on the DI data fed from the input separating operation unit 2 in the same way as in the real operation mode. For example, the value of the DO data becomes equal to 1 in the first cycle in the test mode and to 0 in the second cycle (step s4: control processing operation).

Next, the output separating operation unit 4 generates the PDO data from the DO data fed from the control processing unit 3 in the same way as in the real operation mode (step s5b: output separating operation).

Next, since the real information output operation by the real information output unit 5 is stopped (step s6b), the simulator unit 6 receives the DO data from the output separating operation unit 4 and generates the DI data which becomes the simulated state information by simulating the devices A and B by software. It is now assumed, for example, that the device A is a device which outputs 1 if input data to the device B is 0 and outputs 0 if input data to the device B is 1. Since the value of the DO data is 1 in the first cycle in the test mode, the value of the DI data becomes equal to 0 (step s7: simulation operation).

Subsequently, if the operation of the plant monitoring and control apparatus 10 is not to be stopped (step s8), the operation is returned to step s1 after the specific time period of delay (step s9).

When the operation in the test mode is reexecuted, the input separating operation unit 2 employs the DI data which is the simulated state information generated in the simulation operation (step s3b), and the control processing unit 3 generates the DO data which becomes the simulated control information by performing the specific control processing operation based on the DI data which is the simulated state information. Healthiness of the control processing unit 3 is tested by causing the control processing unit 3 to output the simulated control information (DO data) based on the simulated state information (DI data) and displaying these pieces of information on an unillustrated display unit in the above-described manner.

The aforementioned sequence of processing operations is repeatedly carried out in specific cycles that are delayed by the specific time period in step s9, so that the PDI data, the DI data, the DO data and the PDO data are overwritten and thereby updated every cycle.

While one piece of data (label: PDI01, value: 1) has been shown as the PDI data in the above-described embodiment, there exist many data labels, such as PDI01, PDI02, . . . , individually having different input data regions if there are many pieces of data. In this case, there will exist correspondingly many pieces of DI data, DO data and PDO data having respective data regions.

In the aforementioned embodiment, there is provided the simulator unit 6 for simulating the objects to be monitored and controlled within the plant monitoring and control apparatus 10 to test the healthiness of the control processing unit 3 by switching an input device of the control processing unit 3 and an output device of the control processing unit 3 to the simulator unit 6 in the test mode.

Also, the DI data and the DO data handled by the control processing unit 3 are separated by giving these data the label formats differing from the label formats of the PDI data and the PDO data which are related to input and output between the objects to be monitored and controlled and the plant monitoring and control apparatus 10, so that the PDI data and the PDO data are not directly related to the control processing unit 3. For this reason, it is possible to easily realize an arrangement for switching the input device of the control processing unit 3 and the output device thereof to the internally provided simulator unit 6 in the test mode. Also, by realizing such switching operation, it is possible to provide the simulator unit 6 within the plant monitoring and control apparatus 10 and achieve a further reduction in size and simplification of a system configuration without changing external wirings of the apparatus 10. Additionally, switching between the real operation mode and the test mode is so easy that it is possible to easily verify the healthiness of the control processing unit 3.

The input side of the simulator unit 6 and the output side thereof are connected switchably to the output separating operation unit 4 and the input separating operation unit 2, respectively, so that the input device of the control processing unit 3 and the output device thereof are switched to the simulator unit 6 by the switching operation which allows the simulator unit 6 to exchange information to and from the output separating operation unit 4 and the input separating operation unit 2 in the test mode. By using such a configuration, it is possible to operate individual parts of the input separating operation unit 2, the control processing unit 3 and the output separating operation unit 4 by the same software in the test mode as in the real operation mode. This makes it possible to reduce process load in plant monitoring and control.

Also, the real information input unit 1 and the real information output unit 5 are required to just stop processing without performing any different operation so that the process load in plant monitoring and control can be further reduced.

Second Embodiment

Described next is a case where the plant monitoring and control apparatus 10 shown in the foregoing first embodiment is allowed to perform forced exclusion operation in which the state information or the simulated state information of the objects to be monitored and controlled is forcibly excluded.

When a warning is output from the plant monitoring and control apparatus 10 in the event of a failure of a device in the plant 20, for example, the output warning is continuously given until repair is completed. For this reason, the use of the state information from the pertinent device is inhibited until the repair is completed after a supervisor has noticed the failure. The forced exclusion operation is performed by an externally input command.

Figure 3:
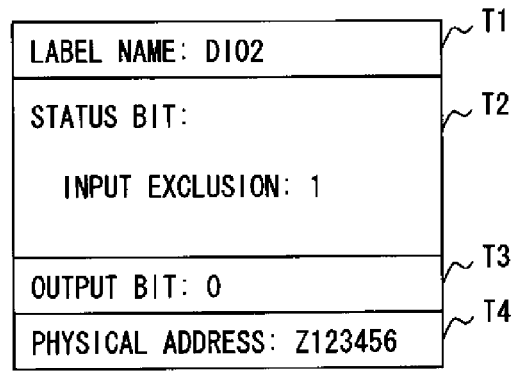
FIG. 3 is a diagram showing a label structure of state information in a separated information label format according to a second embodiment of the invention.

FIG. 3 is a diagram showing a label structure of DI data which is state information in the separated information label format generated by the input separating operation unit 2. As shown in the Figure, the DI data is structured to include a label name T1, a status bit T2 indicating input exclusion, an output bit T3 indicating the value of data and a physical address T4 in which the data is physically stored.

When a command to perform the forced exclusion operation is externally entered into the plant monitoring and control apparatus 10, the status bit T2 is set to validate input exclusion.

Figure 2:
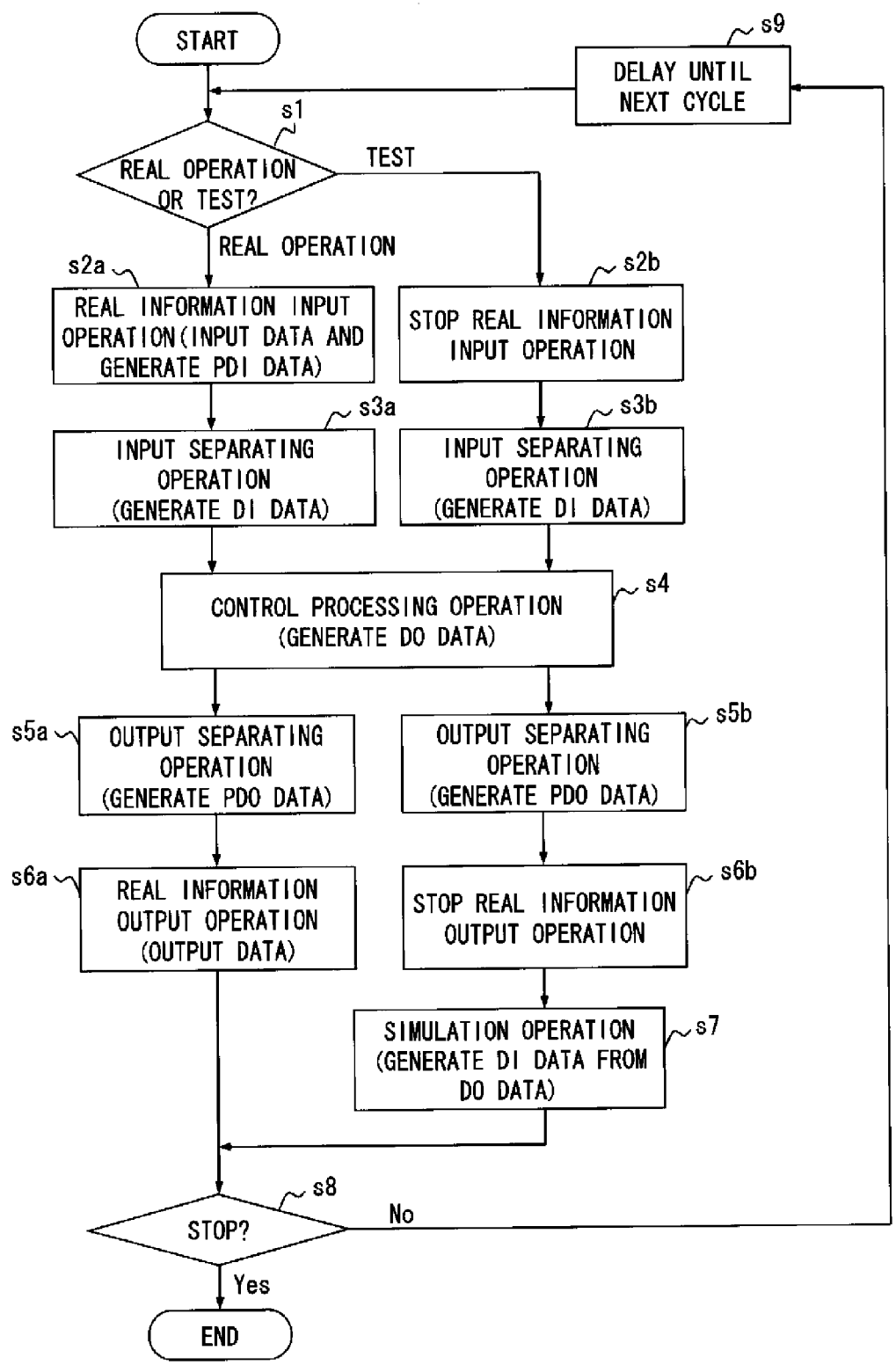
FIG. 2 is a flowchart showing the working of the plant monitoring and control apparatus according to the first embodiment of the invention.
Figure 4:
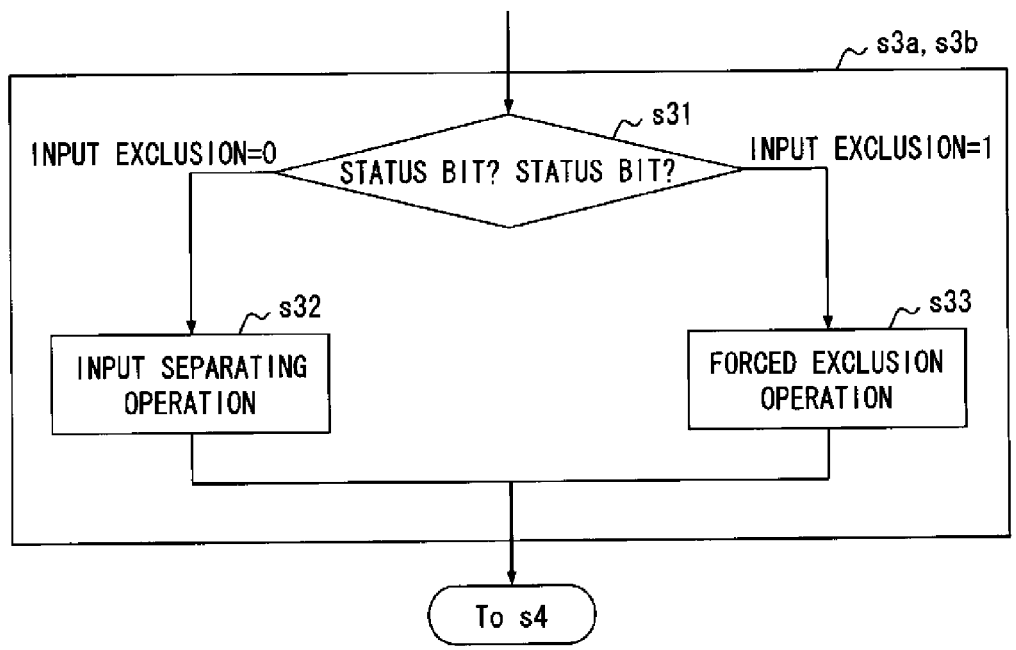
FIG. 4 is a flowchart showing input separating operation according to the second embodiment of the invention.

The plant monitoring and control apparatus 10 executes the operation of steps s3a, s3b after executing the real information input operation of steps s2a, s2b as shown in FIG. 4 in the sequence of operations shown in FIG. 2 in the foregoing first embodiment.

First, the status bit T2 in the data region of the DI data that the input separating operation unit 2 is going to generate is judged (step s31), and if input exclusion is not valid, the input separating operation unit 2 performs the ordinary input separating operation. Specifically, the input separating operation unit 2 generates the DI data converted into the separated information label format by substituting the label and value of the PDI data fed from the real information input unit 1 into the label name T1 and the output bit T3 in the data regions of the DI data, respectively. It is to be noted, however, that the input separating operation unit 2 employs the PDI data generated by the simulator unit 6 in the test mode (step s32).

If input exclusion is valid in step s31, the input separating operation unit 2 substitutes the label of the PDI data fed from the real information input unit 1 into the label name T1 of the data region of the DI data and forcibly substitutes 0 as the value of the output bit T3. It is to be noted, however, that the input separating operation unit 2 forcibly substitutes 0 as the value of the output bit T3 of the DI data generated by the simulator unit 6 in the test mode (step s3a: forced exclusion operation).

Subsequently, the plant monitoring and control apparatus 10 performs the processing operations from step s4 in the same way as in the foregoing first embodiment.

It is possible to easily inhibit the use of the state information from the objects to be monitored and controlled and the simulated control information without modifying the software by structuring the DI data to have the status bit T2 indicating input exclusion and causing the input separating operation unit 2 to forcibly set 0 as the value of the output bit T3 as described above. For this reason, it is possible to reduce the process load in plant monitoring and control.

While the above-described embodiment has shown a case where the use of the state information from the objects to be monitored and controlled or the simulated control information is inhibited, operation for inhibiting output of the control information to the objects to be monitored and controlled and the use of the simulated control information is performed in a below-described manner.

Figure 5:
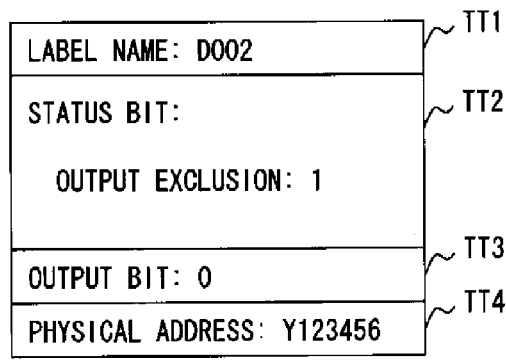
FIG. 5 is a diagram showing a label structure of control information in the separated information label format according to a variation of the second embodiment of the invention.

FIG. 5 is a diagram showing a label structure of DO data which is control information in the separated information label format generated by the control processing unit 3. As shown in the Figure, the DO data is structured to include a label name TT1, a status bit TT2 indicating output exclusion, an output bit TT3 indicating the value of data and a physical address TT4 in which the data is physically stored.

When a command to perform the forced exclusion operation is externally entered into the plant monitoring and control apparatus 10, the status bit TT2 is set to validate output exclusion.

Figure 6:
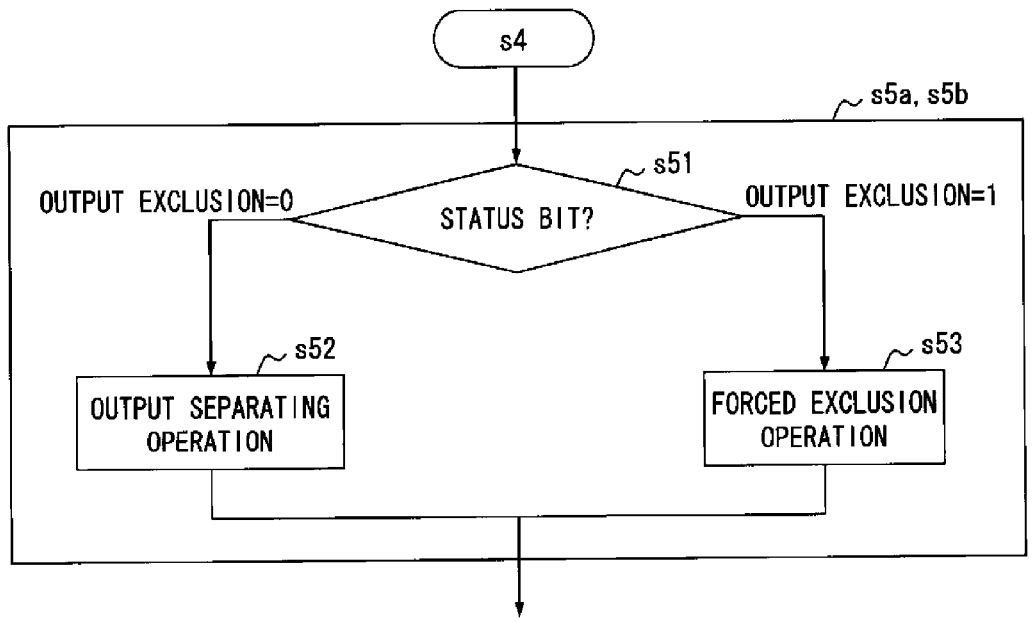
FIG. 6 is a flowchart showing output separating operation according to a variation of the second embodiment of the invention.

The plant monitoring and control apparatus 10 executes the operation of steps s5a, s5b after executing the control processing operation of step s4 as shown in FIG. 6 in the sequence of operations shown in FIG. 2 in the foregoing first embodiment.

First, the output separating operation unit 4 judges the status bit TT2 of the DO data generated by the control processing unit 3 (step s51), and if output exclusion is not valid, the output separating operation unit 4 performs the ordinary output separating operation (step s52).

If output exclusion is valid in step s51, the output separating operation unit 4 generates the PDO data by forcibly substituting 0 as the value of the output bit TT3 of the DO data (step s53: forced exclusion operation).

Subsequently, the plant monitoring and control apparatus 10 performs the processing operations from steps s6a, s6b in the same way as in the foregoing first embodiment.

It is possible to easily inhibit output of the control information to the objects to be monitored and controlled and the use of the simulated control information without modifying the software in this case as well.

Third Embodiment

Described next is a case where the plant monitoring and control apparatus 10 shown in the foregoing first embodiment is allowed to store and use the information (PDI data, DI data, DO data and PDO data) which is generated and updated in specific recurring cycles.

Figure 7:
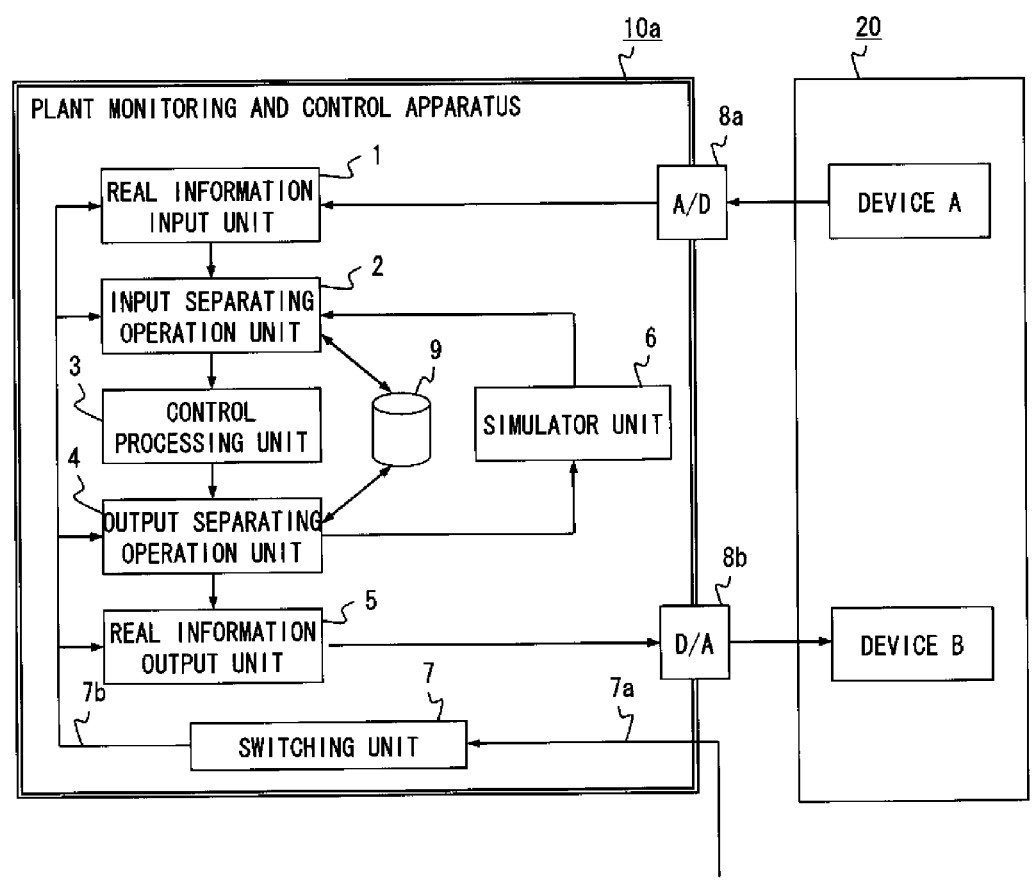
FIG. 7 is a block diagram showing the configuration of a plant monitoring and control apparatus according to a third embodiment of the invention.

FIG. 7 is a block diagram showing the configuration of a plant monitoring and control apparatus 10a according to a third embodiment of the invention. As shown in the Figure, the plant monitoring and control apparatus 10a is provided with a storage unit 9 which stores snapshot data (PDI data, DI data, DO data and PDO data) available at a specific point in time. The configuration of the plant monitoring and control apparatus 10a is otherwise the same as that of the above-described first embodiment.

Figure 8:
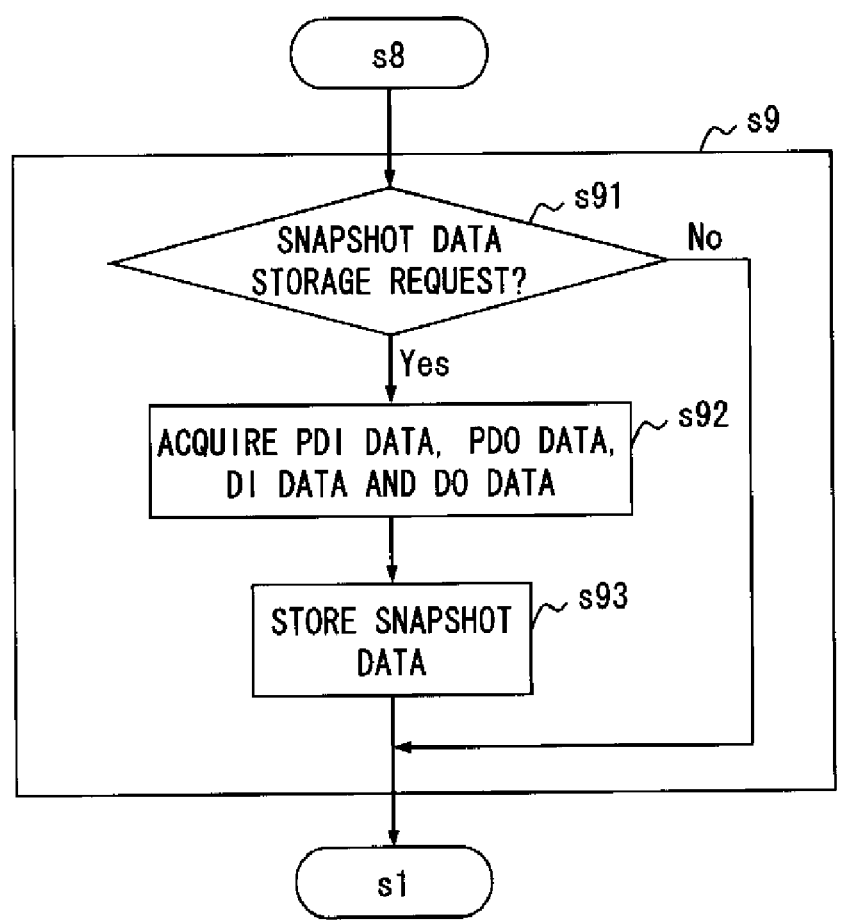
FIG. 8 is a flowchart showing operation for storing snapshot data according to the third embodiment of the invention.

Next, the working of the plant monitoring and control apparatus 10a is described with reference to FIG. 8, focusing in particular on an operational part related to storage of the snapshot data in the storage unit 9. The working of the other parts of the apparatus 10a is the same as in the first embodiment. A command for storing the snapshot data in the storage unit 9 may be given in various ways. For example, this command may be given by a switch provided in the apparatus 10a, as an external input, or by transmission from an external man-machine device. The snapshot data is stored in the storage unit 9 according to the command thus given.

The plant monitoring and control apparatus 10a performs operation of step s9 for introducing a specific time period of delay prior to a succeeding cycle in a below-described manner in the sequence of operations shown in FIG. 2 in the foregoing first embodiment.

First, a judgment is made to determine whether the command indicating a snapshot data storage request has been given (step s91). If the command has been given, the input separating operation unit 2 and the output separating operation unit 4 acquire all pieces of information (PDI data, DI data, DO data and PDO data) available at that point in time, i.e., in a preceding cycle (step s92) and store those pieces of information as the snapshot data in the storage unit 9 (step s93).

The plant monitoring and control apparatus 10a performs the above-described operation within the specific delay time and proceeds to operation of the succeeding cycle.

If no snapshot data storage request is given in step s91, however, the plant monitoring and control apparatus 10a simply introduces the specific time period of delay prior to the succeeding cycle.

Figure 9:
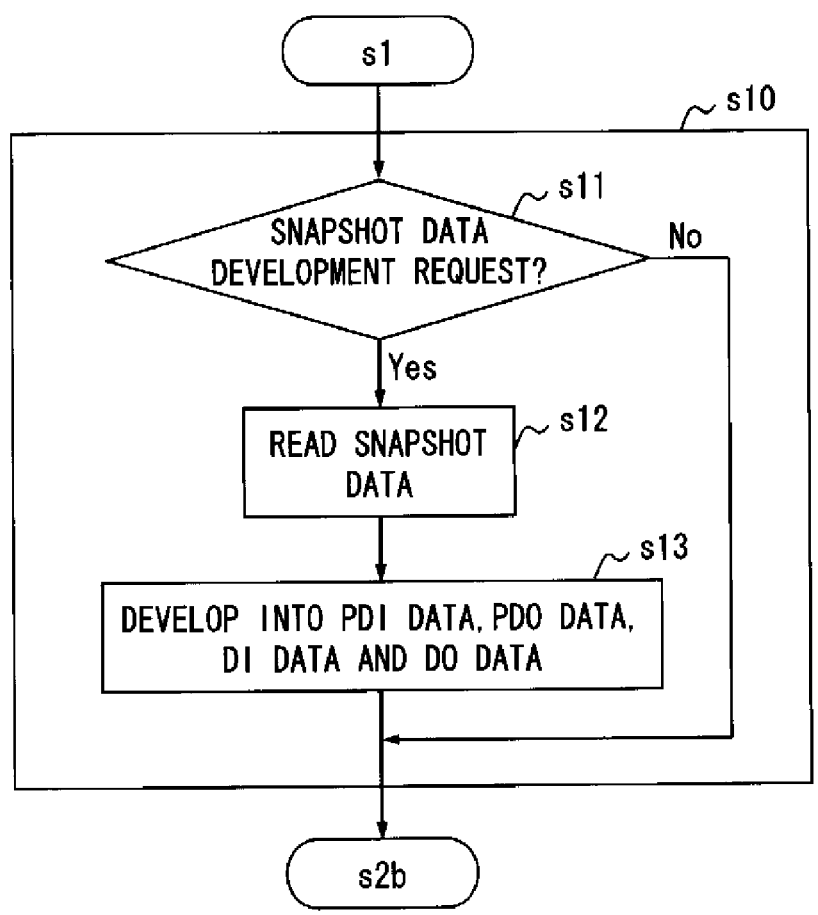
FIG. 9 is a flowchart showing operation for developing the snapshot data according to the third embodiment of the invention.

The snapshot data stored in the storage unit 9 in the aforementioned fashion is used in the test mode in a manner described below. This part of the working of the plant monitoring and control apparatus 10a is now described with reference to FIG. 9. It is to be noted that, when using the snapshot data which has been stored, the snapshot data is returned to the data regions under conditions before storage of the snapshot data as the PDI data, the DI data, the DO data and the PDO data, or the snapshot data is developed in the respective data regions. A command for developing the snapshot data is given from an external source in this case as well.

If the plant monitoring and control apparatus 10a is judged to be in the test mode in step s1 (refer to FIG. 2), the plant monitoring and control apparatus 10a performs operation of step s10 for developing the snapshot data prior to the succeeding step s2b in a below-described manner.

First, a judgment is made to determine whether the command indicating a snapshot data development request has been given (step s11). If the command has been given, the input separating operation unit 2 and the output separating operation unit 4 read out the snapshot data from the storage unit 9 (step s12) and return the snapshot data to the original data regions, or develop the snapshot data into the PDI data, the DI data, the DO data and the PDO data (step s13).

If no snapshot data development request is given in step s11, however, the plant monitoring and control apparatus 10a proceeds directly to step s2b.

It is to be noted that because the real information input operation of step s2b is stopped in the test mode, the plant monitoring and control apparatus 10a proceeds to the operation of step s3b in actuality.

In this embodiment, there is provided with the storage unit 9 to store the snapshot data (PDI data, DI data, DO data and PDO data) of the plant monitoring and control apparatus 10a available at a specific point in time, so that it is possible to store and use with desired timing the individual pieces of information (PDI data, DI data, DO data and PDO data) which are updated in recurring cycles.

Also, in the test mode, the snapshot data is read out from the storage unit 9 and developed into the PDI data, the DI data, the DO data and the PDO data, so that the simulated state information and the simulated control information can be set instantaneously.

The larger the scale of the plant 20, the less easy generation of the simulated state information and the simulated control information and the larger the number of pieces of information to be set in advance if it is desired to simulate a particular plant state. Since the snapshot data indicating the plant state can be read out from the storage unit 9 and used, however, it is possible to test the healthiness of the control processing unit 3 by quickly simulating the particular plant state.

Fourth Embodiment

Figure 10:
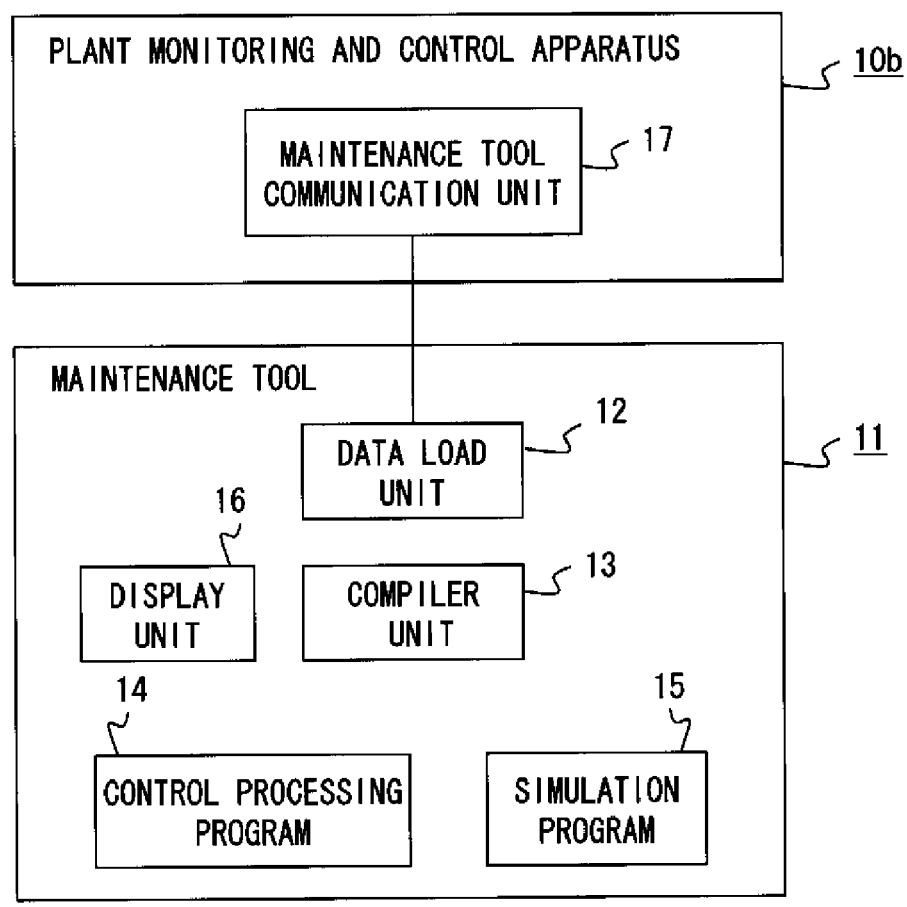
FIG. 10 is a block diagram showing the configuration of a plant monitoring and control apparatus according to a fourth embodiment of the invention.

FIG. 10 is a block diagram showing the configuration of a plant monitoring and control apparatus 10b according to a fourth embodiment of the invention. As shown in the Figure, the plant monitoring and control apparatus 10b is provided with a maintenance tool communication unit 17 for performing communication through a universal serial bus (USB) or a network, for instance, making it possible to connect the apparatus 10b to an external maintenance tool 11. While this plant monitoring and control apparatus 10b is provided with the individual elements provided in the plant monitoring and control apparatus 10 shown in the foregoing first embodiment for monitoring and controlling the objects to be monitored and controlled within the plant 20, these elements are not illustrated for the sake of simplification.

The maintenance tool 11 is provided with a control processing program 14 in which control processing logic used by the control processing unit 3 is written, a simulation program 15 in which simulation logic used by the simulator unit 6 is written, a compiler unit 13 for converting the individual programs 14, 15 into a format which can be executed by the plant monitoring and control apparatus 10b, a data load unit 12 for loading data in the plant monitoring and control apparatus 10b and a display unit 16 having an input function.

As it is necessary to modify the control processing logic and the simulation logic as a result of a change, if any, in the equipment within the plant 20, for instance, the control processing program 14 and the simulation program 15 retained in the plant monitoring and control apparatus 10b are revised as described below.

It is assumed that the control processing program 14 and the simulation program 15 within the maintenance tool 11 are already updated programs written in the same language. When the maintenance tool 11 is connected to the plant monitoring and control apparatus 10b and a modification command is entered into the maintenance tool 11, the control processing program 14 and the simulation program 15 are compiled by the compiler unit 13 at the same time and loaded into storage regions for the control processing program and the simulation program within the plant monitoring and control apparatus 10b, whereby the control processing program 14 and the simulation program 15 are revised.

The control processing program 14 and the simulation program 15 can be modified by parallel processing operation from the external maintenance tool 11 as described above, thereby improving maintainability.

It is to be noted that the display unit 16 within the maintenance tool 11 may be used for verifying the state information and the control information during ordinary monitoring and control operation and displaying result in the test mode.

Various modifications and alterations of this invention will be apparent to those skilled in the art without departing from the scope and spirit of this invention, and it should be understood that this is not limited to the illustrative embodiments set forth herein.

What is claimed is:

1. A monitoring and control apparatus for controlling an external object to be monitored and controlled by performing specific control processing operation based on state information collected from the object to be monitored and controlled, said monitoring and control apparatus comprising:
   a real information input unit for receiving the state information which is a physical signal input from said object to be monitored and controlled and converting the state information into a real information label format which can be processed by software;
   an input separating operation unit for label-converting the state information converted into the real information label format into a separated information label format and outputting the state information thus converted;
   a control processing unit for performing said specific control processing operation based on the state information label-converted into the separated information label format output from said input separating operation unit and outputting control information in the separated information label format;
   an output separating operation unit for label-converting the control information fed from said control processing unit into the real information label format;
   a real information output unit for converting the control information label-converted into the real information label format into a physical signal and outputting the physical signal thus converted to said object to be monitored and controlled;
   a simulator unit for simulating said object to be monitored and controlled by using the control information in the separated information label format which is an output from said control processing unit as an input and outputting simulated state information in the separated information label format; and
   a switching unit for switching said monitoring and control apparatus between real operation for monitoring and controlling said object to be monitored and controlled and simulative operation for operating said simulator unit.

2. The monitoring and control apparatus according to claim 1, wherein an input side of said control processing unit and an output side thereof are connected to said input separating operation unit and said output separating operation unit, respectively, an input side of said simulator unit and an output side thereof are connected switchably to said output separating operation unit and said input separating operation unit, respectively, and wherein said switching unit switches an input device of said control processing unit and an output device thereof to said simulator unit by performing switching operation which allows said simulator unit to exchange information to and from said output separating operation unit and said input separating operation unit during the simulative operation.

3. The monitoring and control apparatus according to claim 1, wherein processing operation by said real information input unit and processing operation by said real information output unit are stopped during the simulative operation.

4. The monitoring and control apparatus according to claim 1, wherein the state information in the separated information label format generated by said input separating operation unit has an output bit and an externally settable status bit indicating input exclusion, and when the status bit indicates input exclusion, said input separating operation unit forcibly sets the value of the output bit to 0.

5. The monitoring and control apparatus according to claim 1, wherein individual pieces of information in the real information label format and the separated information label format are updated by one of the real operation and the simulative operation in specific recurring cycles, and all the pieces of information available at a specific point in time are stored in a storage unit in response to an externally input request.

6. The monitoring and control apparatus according to claim 5, wherein the information in said storage unit is read out and used for the simulative operation in response to an externally input request.

7. The monitoring and control apparatus according to claim 1, wherein an external maintenance tool for modifying a control processing program used by said control processing unit and a simulation program used by said simulator unit is made connectible to said monitoring and control apparatus, said maintenance tool being capable of modifying of the control processing program and the simulation program by parallel processing operation.

8. The monitoring and control apparatus according to claim 7, wherein there is provided a display unit for displaying individual pieces of information in the real information label format and the separated information label format, said display unit serving also as a display unit of said maintenance tool.

* * * * *